J. W. HULME.
AUTOMATIC SAFETY LOCK FOR DOORS.
APPLICATION FILED APR. 5, 1912.
Reissued Sept. 14, 1915.
13,978.
Fig. 1
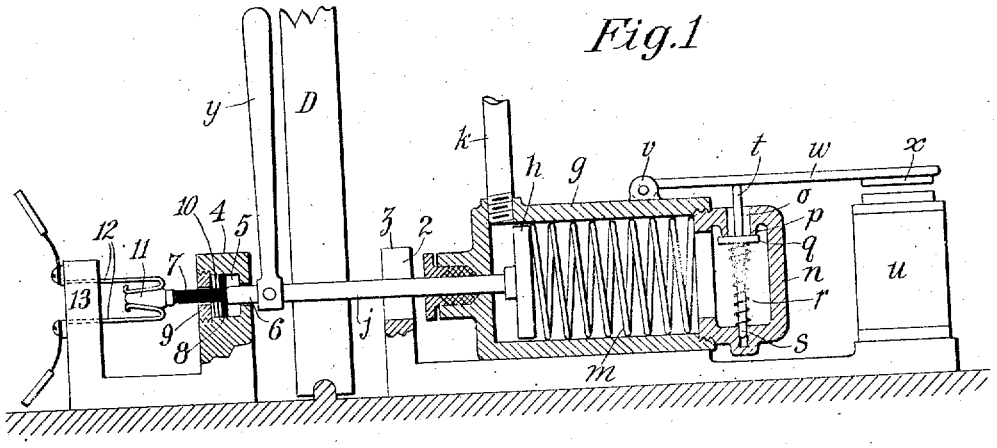
Fig. 2
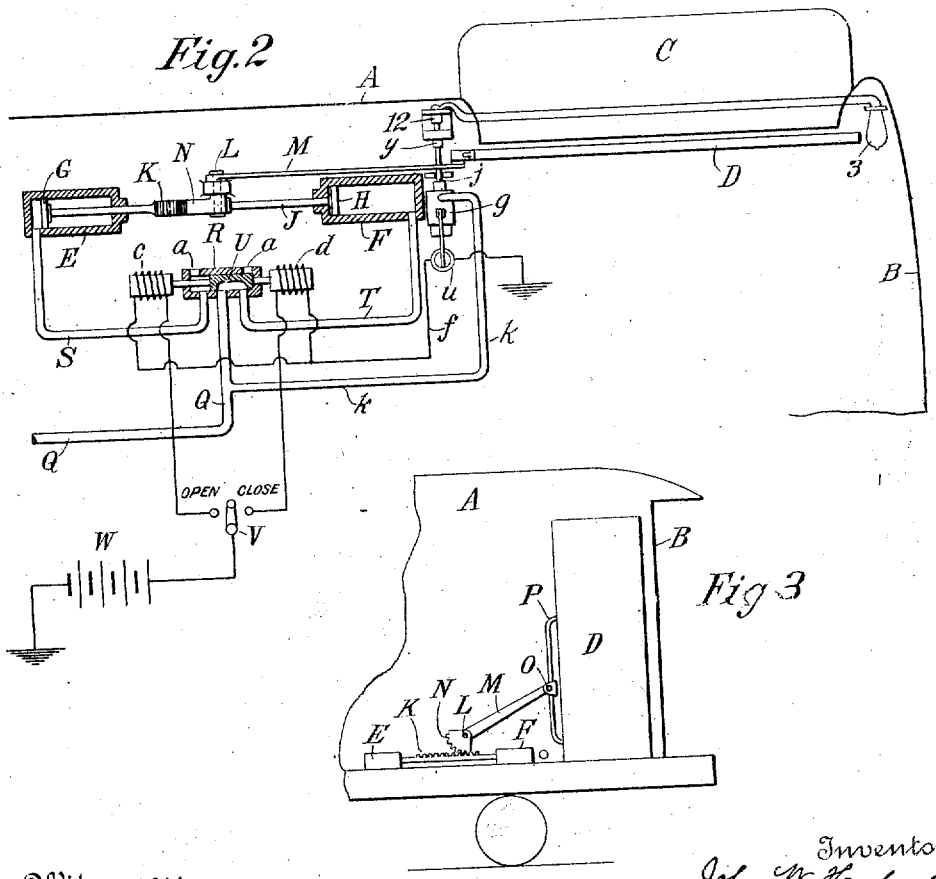
Fig. 3
Witnesses:
L. J. Shaw
H. C. Decker
Inventor
John W. Hulme
By his Attorney
E. M. Bentley

UNITED STATES PATENT OFFICE.

JOHN W. HULME, OF JERSEY CITY, NEW JERSEY, ASSIGNOR TO CONSOLIDATED CAR HEATING COMPANY, OF ALBANY, NEW YORK, A CORPORATION OF WEST VIRGINIA.

AUTOMATIC SAFETY-LOCK FOR DOORS.

13,978. Specification of Reissued Letters Patent. Reissued Sept. 14, 1915.

Original No. 990,877, dated May 2, 1911, Serial No. 585,702. Application for reissue filed April 5, 1912. Serial No. 688,766.

*To all whom it may concern:*

Be it known that I, JOHN W. HULME, a citizen of the United States, and a resident of Jersey City, New Jersey, have invented certain new and useful Improvements in Automatic Safety-Locks for Doors, of which the following is a specification accompanied by drawings.

This invention relates to automatic safety locks for doors, but more particularly to locks for sliding car doors, although the invention may be used with any type of door to which it is applicable.

The objects of the invention are to improve upon automatic safety locks for doors, simplify the construction with as few parts as possible, increase the efficiency and certainty of operation, and prevent the parts from getting out of order.

Another object of the invention is to enable the device to be operated from a distant part of the car, or from the same location at which the door operating mechanism is controlled.

To these ends the invention consists of a device embodying the combinations of elements and arrangement of parts substantially as hereinafter fully described and claimed in this specification and shown in the accompanying drawings, in which:

Figure 1 is a longitudinal elevation partly in section, of the door locking device. Fig. 2 is a diagrammatic plan view partly in section and partly broken away showing one end of a car with the door operating and door locking devices and electrical and pneumatic connections, and Fig. 3 is a side elevation, partly broken away, of one end of the car.

Referring to the drawings, A represents the side of the car body, B the end of the car, and C the step. The door D is adapted to slide back and forth across the car entrance.

The invention is shown in this instance, by way of illustration, in connection with a side end door, but it is to be understood as applicable to the center side doors as well. For a side end door as shown, the door operating mechanism is preferably located beneath a seat adjacent the door and this mechanism may consist of any suitable devices, I having shown as an example electrically controlled pneumatic operating devices. My automatic safety lock may be conveniently operated by air pressure taken from any suitable portion of the air supply line of the car and may be controlled electrically from the most convenient electrical source.

My invention may be applied to a door however operated, whether mechanically, pneumatically, or electropneumatically.

Referring to the type of door operating mechanism illustrated in the drawings, E and F represent cylinders, the pistons G and H of which are connected by a common piston rod J provided with a rack K. Pivoted at L above the rack K is a lever M having one end provided with a toothed segment N meshing with the rack K, the other end pivoted to a slide O movable on the guide P at the back of the door D.

The air supply line Q is connected to slide valve casing R, which casing in turn is connected by pipes S and T with the cylinders E and F. The casing R is provided with the exhaust ports *a* and the slide valve U controlling the air connections to the cylinders. This valve U is controlled by the solenoids *c* and *d*, the cores of which are connected to the valve.

As shown in this instance, the circuits of the solenoids *c* and *d* include a suitable three point or reversing switch V connected to a suitable source of supply as a battery W, the negative pole of which may be conveniently grounded. One side of the switch is connected to solenoid *c* and the other to solenoid *d* and a common return wire *f* leads to ground. By operating the switch V, the controlling valve U is moved in the desired direction to control the operation of the cylinders E and F and open or close the door D.

In accordance with this invention, means are provided for automatically locking the door closed, and for automatically releasing the lock when the door is to be opened. In this instance the locking device is shown in the form of a stop adapted to be projected behind the door when the door is closed and withdrawn to permit the door to be opened.

A suitable form of mechanism for operating and controlling this stop is shown as a cylinder *g* having a piston *h* and a piston rod *j* which piston rod forms the door stop and projects behind the door when the door is in closed position. The cylinder *g* may be connected by pipe *k* with the air supply line Q which in this case operates the door D, for a reason hereinafter to appear. The piston *h* should preferably fit the cylinder *g* loosely to allow leakage or should otherwise be constructed to allow leakage, as by means of a leak hole, the amount of leakage depending upon the time required to operate the door.

Behind the piston is placed a coiled spring *m* of sufficient strength to overcome the inertia of the piston and carry it through its return stroke aided by leakage from the front of the piston. At the rear of the cylinder *g* is shown a valve casing *n*, having an exhaust port *o* with a narrow valve seat *p* against which a valve *q* is seated by a light spring *r* which may be coiled about the valve spindle *s*. The upper end *t* of the valve spindle projects outside of the casing *n* in position to be actuated by suitable controlling devices. Any suitable exhaust valve may be used in place of that disclosed, as a standard whistle valve or a balanced valve.

To control the valve *q* I have shown an electromagnet *u*, in this case connected in series with the controlling solenoids *c* and *d*, although I am not to be understood as limiting the invention to this location of the controlling magnet *u*. Pivoted at *v* on the cylinder *g* is a lever *w* bearing on the end *t* of the spindle *s*, the outer end *x* of said lever forming the armature for magnet *u*, so that when said magnet is energized, the armature *x* is attracted, and valve *q* is forced open against the pressure within the cylinder *g*, thus allowing the cylinder *g* to exhaust. The piston *h* moves rapidly to the back of the cylinder, thus retracting or withdrawing the piston rod *j* from behind the door D. The piston *h* will return slowly toward the locking position owing to the leakage.

In the operation of the device, let it be assumed that the door D is closed as shown in Figs. 1 and 2, the switch V is open and the piston rod *j* is in locking position, with valve *q* closed. To open the door D the operator moves switch V to energize solenoid *c*, which at the same time in this instance energizes electro-magnet *u*, attracting armature *x*, and opening valve *q*. The piston *h* moves quickly from locking position to the end of its stroke, compressing spring *m*. The operator holds switch V closed momentarily to be sure the controlling valve U has operated, and then reopens the switch V, deënergizing solenoid *c* and magnet *u*, so that valve *q* is reseated by spring *r*. Since it will require a few seconds for the leakage around the piston to substantially equalize the pressure, sufficient time will be afforded to permit the door to open. To close the door the switch V is moved to energize solenoid *d* and at the same time magnet *u*, thereby repeating the operations described in connection with the locking device, which is withdrawn away from the door, while the door is closing, and then returns to locking position behind the door.

If for any reason the door should fail to operate, due to failure of air or electricity, the lock will not operate and the door will be maintained closed. If it should be desired to operate the door by hand as in case of accident, a hand operating lever *y* is provided on the piston rod *j*, and the door guide *z* may be slotted at 2 to permit the lever *y* to slide in the guide. Means may also be provided for controlling an electric signal lamp 3 by the operation of the door lock. As shown in this instance the door guide 4 is recessed at 5 and the end 6 of the locking rod *j* projects into the recess in locking position. A pin 7 having a head 8 is mounted in the recess 5, and said pin projects through a head 9 adapted to be screw threaded into the guide 4 to close recess 5. Between the closing head 9 and the head 8 of the pin is arranged a spring 10 normally tending to retract the pin 7. The pin 7 is provided with a contact 11 adapted to enter between the spring contacts 12 mounted in the bracket 13 and close the lamp circuit to the lamp 3, when the door is closed.

I claim and desire to obtain by Letters Patent the following:

1. In an automatic safety lock for doors, the combination with a door and a locking device, pneumatic devices for operating said door and said locking device supplied from the same supply line, electro-magnetic devices for controlling said door operating and lock operating devices, and means for simultaneously controlling said electro-magnetic devices.

2. In an automatic safety lock for doors, the combination with a door and a lock, of interconnected operating means for simultaneously and automatically actuating both the door and the lock, and for preventing the operation of one without the other, and interconnected controlling means for simultaneously and automatically controlling the operation of both the door and lock operating means, and for preventing the operation of one of said controlling means without the other.

3. In an automatic safety lock for doors, the combination with a door and a lock, of door operating means and lock operating means, common connections between said two operating means, whereby both operate simultaneously, controlling devices for the door operating means, controlling devices for the lock operating means, and means for actuating said controlling devices simultaneously.

4. In an automatic safety lock for doors, the combination with a door and a lock, of pneumatic means for actuating the door to open and close the same, pneumatic means for actuating the lock, pneumatic connections between said actuating means whereby the lock is released when the door is opened, and simultaneously actuated electro-magnetic controlling devices for said pneumatic actuating means for the door and lock.

5. In an automatic safety lock for doors, the combination with a door and a locking device, pneumatic devices for operating said door and said locking devices, electromagnetic devices for controlling said door operating and lock operating devices, and means for simultaneously controlling said electromagnetic devices.

6. In an automatic safety lock for doors, the combination with a door and a lock therefor, of power devices for operating said door and lock, and separate devices controlling the operation of said door and lock power devices, said controlling devices being actuated from a source of power separate from that for actuating said door and lock power devices.

7. In an automatic safety lock for doors, the combination with a door and a lock therefor, of power devices for operating said door and lock, separate devices controlling the operation of said door and lock power devices, said controlling devices being actuated from a source of power separate from that for actuating said door and lock power devices, and of a different character.

8. In an automatic safety lock for doors, the combination with a door and a lock therefor, of power devices for operating said door and lock, separate devices controlling the operation of said door and lock power devices, said controlling devices being actuated from a source of power separate from that for actuating said door and lock power devices, and a common means for controlling said controlling devices.

9. In an automatic safety lock for doors, the combination with a door and a lock therefor, of power devices for operating said door and lock, separate devices controlling the operation of said door and lock power devices, said controlling devices being actuated from a source of power separate from that for actuating said door and lock power devices, and a common means for simultaneously controlling said controlling devices.

10. In an automatic safety lock for doors, the combination with a door and a lock, of power devices for operating said door and lock actuated by power from the same source, and separate devices controlling the operation of said door and lock power devices, said controlling devices being actuated from a source of power separate from that for actuating the door and lock power devices.

11. In an automatic safety lock for doors, the combination with a door and a lock, of power devices for operating said door and lock actuated by power from the same source, and separate devices controlling the operation of said door and lock power devices, and operated from a common source of power different in character from the power actuating the door and lock power devices.

12. In an automatic safety lock for doors, the combination with a door and a lock therefor, of power devices for operating said door and lock, and separate devices controlling the operation of said door and lock power devices, said controlling devices being actuated from a source of power separate from that for actuating said door and lock power devices, said lock being provided with means whereby the same may be manually operated.

13. In an automatic locking device for doors, the combination with a door and lock, of operating means for said lock, adapted to be quickly withdrawn from locking position, mechanism for causing the operating means to slowly return to locking position, and means for controlling said mechanism.

14. In an automatic locking device for doors, the combination with a door and lock, of a fluid pressure cylinder connected to operate the lock, provided with means for quickly withdrawing the lock and means carried by the cylinder for causing a slow return of the lock to locked position.

15. In an automatic locking device for doors, the combination with a door and lock, a fluid pressure cylinder, a piston and piston rod, and means for permitting leakage from one side of the piston to the other, to permit a slow return motion of the piston, and means carried by the cylinder for permitting pressure to escape therefrom.

16. In an automatic locking device for car doors, the combination with a door, of a motor for opening and closing the door, a controller therefor, an automatic lock for the door, and means for restoring the lock to locking engagement with the door in the event of the said motor failing to open the door.

17. In an automatic locking device for car doors, the combination with a door, of an operating pressure-motor therefor, means for unlocking the door and admitting pressure to the door motor, and means acting after the admission of pressure to automatically relock the door in the event of the pressure in the motor failing to open it.

18. In an automatic locking device for car doors, the combination with a door, of an operating motor therefor, a lock therefor, independent devices for releasing the lock and admitting power to the motor, and retarded restoring means for the lock permitting the action of the said motor between the releasing and the restoring of the lock.

19. In an automatic locking device for doors, the combination with a door and operating means therefor, of a lock, and automatic unlocking and relocking devices so timed with respect to each other as to permit the said operating means to act on the door.

20. An automatic locking device for doors, comprising a fluid pressure cylinder, a piston and piston rod, fluid pressure connections at one side of the piston, a spring at the other side of the piston, means for permitting leakage around the piston, and an automatic valve for relieving the pressure.

21. An automatic locking device for doors, comprising a cylinder and piston, fluid pressure connections at one side of the piston, and an automatic valve at the other side of the piston, means for permitting leakage from one side of the piston to the other and a spring adapted to return the piston after its initial stroke.

In witness whereof I have hereunto set my hand, before two subscribing witnesses, this 22d day of March, 1912.

JOHN W. HULME.

Witnesses:
HERBERT G. OGDEN,
HENRY SHELDON.